J. B. MOODY.
SELF SERVING VEHICLE STORE.
APPLICATION FILED FEB. 24, 1920.
1,355,408.
Patented Oct. 12, 1920.
2 SHEETS—SHEET 1.
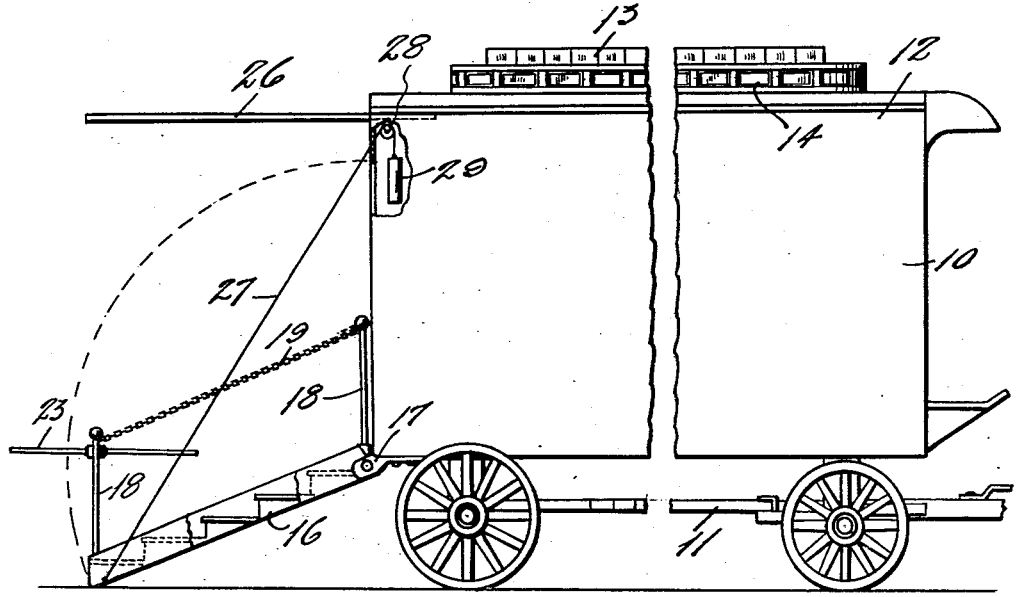
Fig. 1.
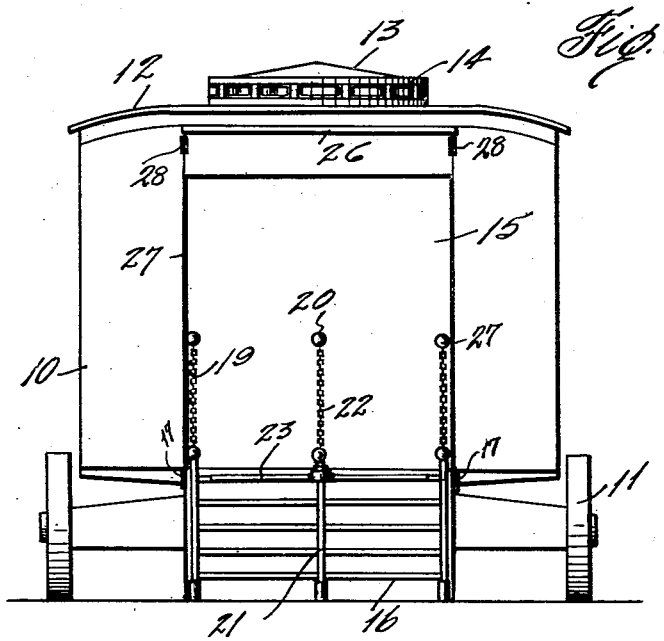
Fig. 2.
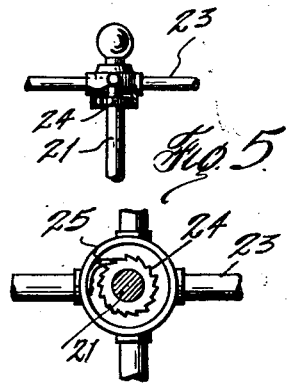
Fig. 5.
Fig. 6.
Inventor
J. B. Moody
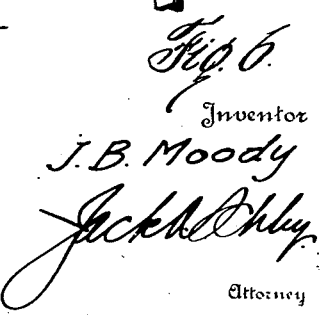
Attorney

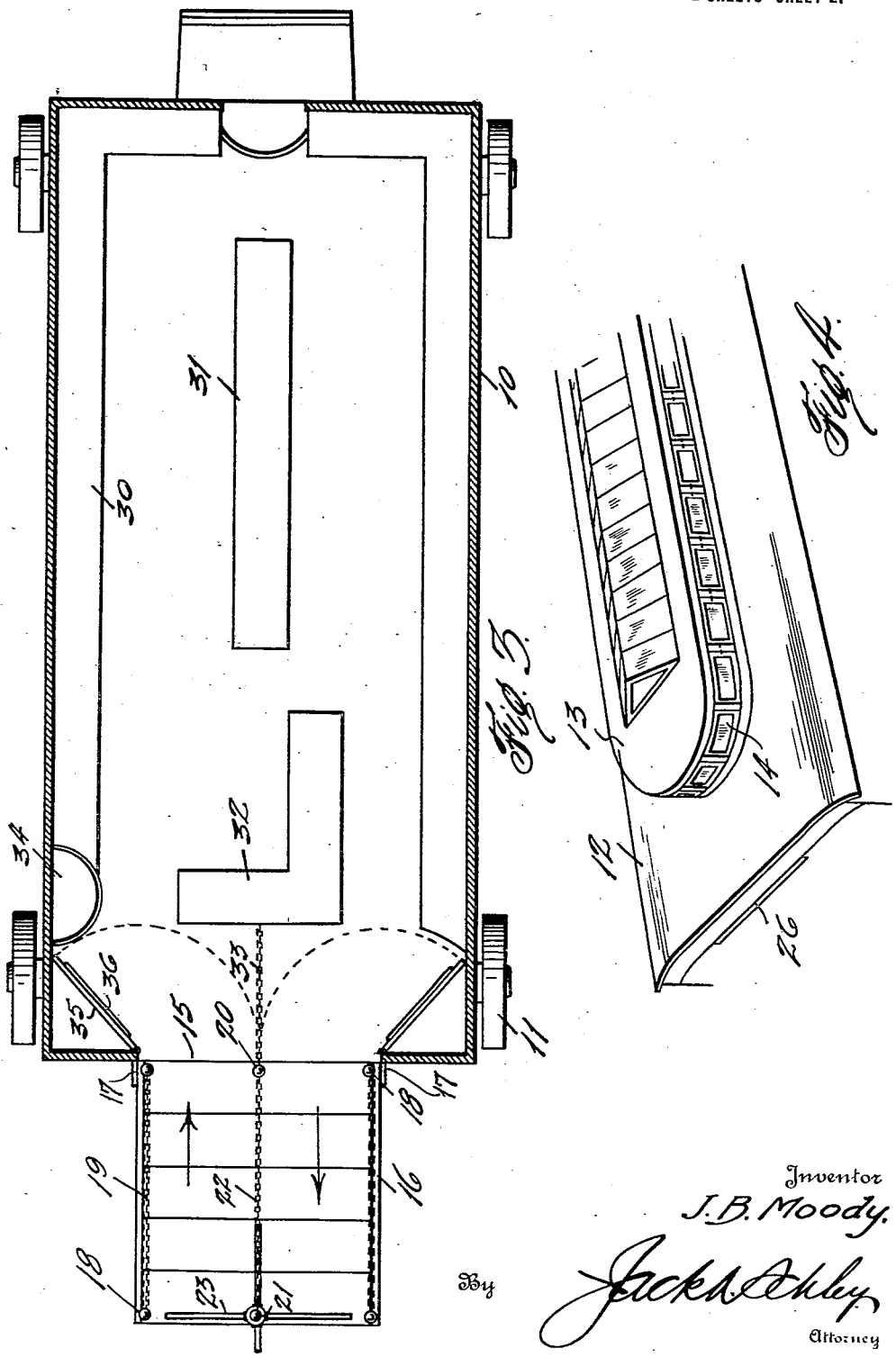

UNITED STATES PATENT OFFICE.

JASON B. MOODY, OF HOUSTON, TEXAS.

SELF-SERVING VEHICLE-STORE.

1,355,408. Specification of Letters Patent. Patented Oct. 12, 1920.

Application filed February 24, 1920. Serial No. 360,846.

*To all whom it may concern:*

Be it known that I, JASON B. MOODY, a citizen of the United States, residing at Houston, in the county of Harris and State of Texas, have invented certain new and useful Improvements in Self-Serving Vehicle-Stores, of which the following is a specification.

This invention relates to new and useful improvements in self serving vehicle stores.

The purpose of the invention is to provide within a vehicle a self serving store into which the customers may enter and through which they pursue a predetermined path thus passing the storage and display shelves and counters so as to select their purchases and pay for the same as they leave the vehicle. The particular object is to provide certain advantageous features peculiar to this invention and whereby systematic and highly satisfactory results may be had.

In carrying out the invention a vehicle body is provided with an entrance stairway and an exit stairway properly separated from each other. The interior of the vehicle is separated by counters so that the customer upon entering will be induced to pass to the far end of the vehicle and return on the opposite side; however, the base is made for passage across the vehicle if desired. One of the features resides in the provision of storm doors which when not in use may be disposed at such an angle as to give the door keeper a view of all parts of the store which are in rear of his position and which may be readily closed in bad weather. Provision is also made for storage racks for baskets for usage of customers, ventilation and light. The stairway is arranged to be folded up when the vehicle is not in use and includes a turnstile. A sliding canopy is carried at the rear end of the vehicle and may be slid out over the stairway. When the stairway is folded up it forms the back door of the vehicle.

The invention will be more readily understood from a reading of the following specification and by reference to the accompanying drawings, in which an example of the invention is shown, and wherein:

Figure 1 is a side elevation of vehicle store constructed in accordance with this invention, Fig. 2 is a rear elevation of the same, Fig. 3 is a horizontal cross-sectional view of the same, Fig. 4 is an isometrical view of the roof of the vehicle, Fig. 5 is a detail of the turnstile, and Fig. 6 is a cross-sectional detail of the same.

In the drawings the numeral 10 designates a vehicle body which may be of any approved construction and may be mounted on a running gear 11 of a wagon or other kind of vehicle. The vehicle body has a roof 12 in which a skylight 13 is mounted and this skylight may have pivoted sashes 14 around its sides which while admitting light may be also opened for ventilation.

At the rear end of the body a doorway 15 is provided. A stairway 16 has its upper end hinged to the floor or bed of the body at 17, while its lower end rests on the ground. At the top and bottom of the stairway on each side posts 18 are mounted and each pair of posts are connected at their upper end by a chain 19 which forms guards at each side of the stairway to keep the customer from stepping off. A central post 20 is provided at the top of the stairway and a central post 21 is provided at the bottom of the stairway and these latter posts are connected by a chain or other connection 22. A turnstile 23 is mounted on top of the post 21 so that its arms obstruct the passages formed on each side of the chain 22. As shown in detail in Figs. 5 and 6 a ratchet wheel 24 is mounted on the post 21 and the turnstile carries a pawl 25 engaging with the ratchet so as to compel the customer to turn the turnstile in the proper direction thus preventing him from entering the wrong passageway.

Referring to Fig. 3 it is pointed out that the left hand passageway is the entrance and the right hand passageway is the exit, this is also shown in Fig. 2. A sliding canopy 26 of suitable construction is mounted just under the roof so as to slide out over the stairway and protect the same in bad weather. A pair of flexible connections 27 are attached to each side of the bottom of the stairway and are carried up and over pulleys 28 in the rear of the vehicle body as is shown Figs. 1 and 2. Weights 29 are attached to the upper end of the connections 27 and assist in raising the stairway when the latter is swung upward and into the opening 15, the underside of the stairway forming a closure for the doorway 15. The posts at the upper end of the stairway are arranged to be removed when the stairway is folded up.

Along each side of the body and across the front end suitable shelves or compartments 30 are arranged within the same and the exact construction of these may be varied as the occasion demands. A central counter or stand 31 is placed within the body and spaced from the front end thereof. A substantially L-shaped counter 32 is arranged between the doorway 15 and the rear end of the stand 31 so that there will be a passage between the stand and the counter. A chain or other connections 33 extends from the post 20 to the counter 32 so that customers entering the store must pass to the left of the counter 32. Opposite the left hand end of the counter 32 a compartment 34 is provided for baskets and the like which may be used by the customers. It will be seen that the customers after passing the counter 32 may continue around the store or may cross the same between the counter and stand and quickly pass out on the right hand side of the counter.

The attendant or store keeper stands behind the counter 32 facing the doorway 15. The longitudinal leg or portion of the counter 32 provides room for the customers to line up and place their purchases on said counter; while the transverse portion of said counter provides a space for the cash register and adding machine or other equipment of the store keeper. One of the features is a pair of doors 35 which are hinged at each side of the doorway 15 and when opened fold back within the side of the vehicle body and are suitably fastened. Mirrors 36 are arranged on these doors so that when the latter are fastened in their open position the said mirrors will be at a certain angle that the door keeper may readily glance into the same and view the entire store behind him, thus enabling him to see that the customers are properly waiting on themselves and also enabling him to observe the stock on his shelves without leaving his position.

It is obvious that various equipment and attachment could be added and the invention contemplates the addition of conveniences or necessities as are obvious. The arrangement is simple and provides for a free passage of the customers through the store, as well as across the store. During stormy weather the doors 35 may be closed. It is pointed out that a customer desiring to purchase a certain article which is near the front of the store may pass in select said article and then cross the store between the stand 31 at the counter 32, quickly settle for his purchase and then pass out without the necessity of going entirely around the store.

What I claim, is:

1. In a dispensing vehicle, the combination with a vehicle body having means arranged interiorly thereof and extending longitudinally of the same for storing merchandise, said body being provided at one end with a door opening, a pair of swinging doors for closing the door opening and adapted to move inwardly to assume angular positions within the corners of the vehicle body at one end thereof, reflectors carried by the doors, and a counter arranged near and between the reflectors.

2. In a dispensing vehicle, the combination with a vehicle body having provision for storing merchandise therein, of a counter at one end of the body, means for causing customers to pass on each side of said counter in entering and exiting from the store, a central stand in the body separated from the counter, and doors arranged at the entrance end of the body and mirrors carried by the doors and correlated with the counter so that the store keeper at the counter may view the store in rear of his position by observing the mirrors.

3. In a dispensing vehicle, the combination with a vehicle body having provision for storing merchandise therein and provided with a doorway, of a pair of doors for said doorway normally adapted to open within said vehicle body, mirrors mounted on said doors, said doors normally being disposed at such angles as to cause the mirrors to reflect the contents of the vehicle body for the full length thereof and a counter arranged within said vehicle body near and between said mirrors.

4. In a dispensing vehicle, the combination with a vehicle body having provision for storing merchandise therein and provided with a doorway at its rear end, of a pair of doors for said doorway adapted to open within said vehicle body, mirrors mounted on said doors, said doors normally being disposed at such angles as to cause the mirrors to reflect the contents of the vehicle body for the full length thereof, and a store keeper's counter arranged adjacent the doors and disposed in front of the doorway.

5. In a dispensing vehicle, the combination with a vehicle body having provision for storing merchandise therein and provided with a doorway at its rear end, of a stairway hinged to the rear end of the vehicle body at the doorway and arranged to fold upward at said doorway, means for dividing said stairway into two passages, and means on the stairway for compelling traffic in opposite directions in the passages.

6. In a dispensing vehicle, the combination with a vehicle body having passages therein and interior compartments arranged upon opposite sides of the body and some of the passages, of a counter within the body and near one end, a stairway approaching the end of the vehicle having the counter, means for dividing the stairway into two passages each having provision for traffic in one direction only, and means between the stairway and the counter for causing traffic to pass on a predetermined side of said counter.

7. In a dispensing vehicle, the combination with a vehicle body having means arranged interiorly thereof and extending longitudinally of the same for storing merchandise, said vehicle body being provided at one end with a door opening, reflectors angularly arranged within the end of the vehicle body upon opposite sides of the door opening, and a counter arranged within the vehicle body near the central longitudinal axis thereof and near the reflectors.

8. In a dispensing vehicle, the combination with a vehicle body having means extending longitudinally thereof and interiorly of the same for storing merchandise, said vehicle body being provided at one end with a door opening, a stairway leading to the door opening, means connected with the stairway for dividing the same into a pair of passages, such dividing means extending into the vehicle body for a substantial distance, a counter arranged within the rear portion of the vehicle body near its central longitudinal axis and having connection with the dividing means, a turn-stile pivoted upon the intake end of the stairway and controlling both passages, and means to cause the turn-stile to turn in one direction only.

In testimony whereof I affix my signature.

JASON B. MOODY.